(12) United States Patent
Nicolas et al.

(10) Patent No.: US 8,449,961 B2
(45) Date of Patent: May 28, 2013

(54) PIPE FOR THE AIR INTAKE CIRCUIT OF A MOTOR VEHICLE ENGINE, AND CIRCUIT INCORPORATING THE SAME

(75) Inventors: Ludovic Nicolas, Villemandeur (FR); Gwenaëlle Bierce-Argy, Ferrieres en Gâtinais (FR); Sandrine Houee, Amilly (FR); Christian Larroque, Pannes (FR); Alper Caliskan, St Jean de la Ruelle (FR)

(73) Assignee: Hutchinson, Paris (FR)

( * ) Notice: Subject to any disclaimer, the term of this patent is extended or adjusted under 35 U.S.C. 154(b) by 72 days.

(21) Appl. No.: 13/158,772

(22) Filed: Jun. 13, 2011

(65) Prior Publication Data

US 2011/0303318 A1 Dec. 15, 2011

(30) Foreign Application Priority Data

Jun. 14, 2010 (FR) ...................................... 10 02501

(51) Int. Cl.
*B29D 22/00* (2006.01)

(52) U.S. Cl.
USPC ........................................ 428/36.91; 138/137

(58) Field of Classification Search
USPC ............... 428/36.91; 138/137, 123, 124, 126; 525/250; 181/250, 229
See application file for complete search history.

(56) References Cited

U.S. PATENT DOCUMENTS

| | | | | |
|---|---|---|---|---|
| 3,458,461 A | * | 7/1969 | France | ........................ 525/330.4 |
| 4,486,167 A | * | 12/1984 | McMurray et al. | ........... 431/114 |
| 4,525,185 A | * | 6/1985 | Newton | ........................ 62/612 |

(Continued)

FOREIGN PATENT DOCUMENTS

| | | |
|---|---|---|
| EP | 1 334 995 A1 | 8/2003 |
| EP | 1 568 484 A1 | 8/2005 |
| JP | 2006-247883 A | 9/2006 |
| WO | WO 2004/029493 A1 | 4/2004 |

OTHER PUBLICATIONS

Search Report for French Application No. FR 10 02 501, dated Feb. 2, 2011.

(Continued)

*Primary Examiner* — N. Edwards
(74) *Attorney, Agent, or Firm* — Alston & Bird LLP

(57) ABSTRACT

The present invention relates to a pipe usable for an air intake circuit of a motor vehicle engine, and to this air intake circuit in particular for the intake of air at the outlet of a turbocompressor that comprises at least one such pipe.

This pipe (1) comprises at least one inner elastomer layer (10), one outer elastomer layer (16), one intermediate elastomer layer (12) and one reinforcing structure (14) which is situated between the intermediate and outer layers and which comprises yarns based on an aliphatic polyester, such as a PET, each intermediate and outer layer being formed from a composition based on at least one acrylate copolymer (ACM).

According to the invention, said composition is crosslinked by means of a system chosen from the group consisting of those based on at least one soap combined with sulfur, with a urea derivative and those based on a thiadiazole.

11 Claims, 1 Drawing Sheet

U.S. PATENT DOCUMENTS

| | | | | |
|---|---|---|---|---|
| 4,806,584 | A * | 2/1989 | Hoyt et al. | 524/376 |
| 5,079,304 | A * | 1/1992 | DeMarco | 525/329.8 |
| 5,219,967 | A * | 6/1993 | Miyagawa et al. | 526/273 |
| 5,319,036 | A | 6/1994 | DeMarco | |
| 5,548,032 | A * | 8/1996 | Tokunaga et al. | 525/352 |
| 6,035,899 | A * | 3/2000 | Ohkoshi et al. | 138/123 |
| 6,114,459 | A * | 9/2000 | Kuzumaki et al. | 525/281 |
| 7,371,446 | B2 * | 5/2008 | Kerstetter et al. | 428/36.9 |
| 7,550,536 | B2 * | 6/2009 | Kobayashi et al. | 525/222 |
| 7,993,569 | B2 * | 8/2011 | Kobayashi et al. | 264/553 |
| 8,177,024 | B2 * | 5/2012 | Caliskan | 181/250 |
| 2005/0165191 | A1 * | 7/2005 | Kobayashi et al. | 526/319 |
| 2006/0043646 | A1 * | 3/2006 | Kobayashi et al. | 264/476 |
| 2006/0167159 | A1 * | 7/2006 | Kubota et al. | 524/439 |
| 2010/0297452 | A1 * | 11/2010 | Funayama et al. | 428/413 |
| 2011/0303318 | A1 * | 12/2011 | Nicolas et al. | 138/137 |
| 2012/0141712 | A1 * | 6/2012 | Otaka et al. | 428/36.91 |

OTHER PUBLICATIONS

Database WPI; Week 199112; Thomson Scientific, London, GB; AN 1991-084553; XP002619903 & JP 3 031351 A (TOSOH Corp); Feb. 12, 1991.

Database WPI; Week 200864; Thomson Scientific, London, GB; AN 2008-K77747; XP002619904 & JP 2008 188952 A (Bridgestonecorp); Aug. 21, 2008.

Database WPI; Week 200808; Thomson Scientific, London, GB; AN 2008-B21286; XP002619905 & JP 2007 269008 A (Tokai Rubber Ind Ltd); Oct. 18, 2007.

* cited by examiner

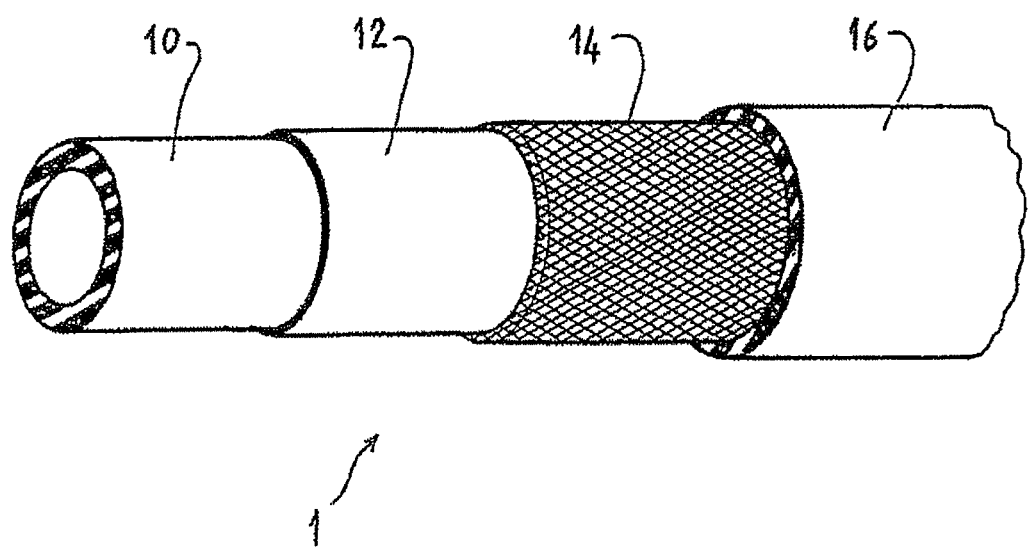

PIPE FOR THE AIR INTAKE CIRCUIT OF A MOTOR VEHICLE ENGINE, AND CIRCUIT INCORPORATING THE SAME

FIELD OF THE INVENTION

The present invention relates to a pipe usable for an air intake circuit of a motor vehicle engine, and to this air intake circuit in particular for the intake of air leaving a turbocompressor that incorporates at least one such pipe. The invention applies more generally to a fluid transportation pipe, irrespective of the nature of this fluid and of its circulation conditions.

BACKGROUND

In general, a pipe that transports a fluid in liquid or gaseous form must especially withstand the pressure, temperature and corrosiveness of the transported fluid, on the one hand, and the corrosiveness of the surrounding medium, on the other hand.

In the case of an air intake pipe for a turbocompressed motor vehicle engine, the fluid is hot air at a pressure of about 1.5 to 2 bar and at a temperature of about 100° C. to 200° C., and this hot air is charged with oil (in particular oil used to lubricate the turbocompressor), which makes it necessary to ensure that the inner layer of this pipe satisfactorily withstands the aggressive nature of the oil. Moreover, as the temperature under the engine cowl tends to increase more and more, the air intake pipe must withstand an external temperature of about 150° C.

To obtain such resistance, use is generally made of inner and outer layers for this pipe that are both made of elastomeric materials based on ethylene-acrylic acid copolymers (abbreviated as AEM, in particular VAMAC®) crosslinkable with an amine or a peroxide, or alternatively copolymers of an acrylate and of a comonomer providing reactive sites for crosslinking with sulfur or with an amine (abbreviated as ACM).

Also in a known manner, these air intake pipes are reinforced with ribbed fabric that is arranged between these inner and outer layers and that is usually formed from multifilaments of m-aramid (aromatic polyamide), which gives the pipe excellent resistance to high external temperatures. However, m-aramid has the drawback of penalizing the overall manufacturing cost of the pipe when compared with PET (polyethylene terephthalate) especially, which is a much less expensive material.

Document EP-A1-1 334 995 presents a pipe, for example for an air intake circuit at the outlet of a turbocompressor, which may comprise, between these inner and outer layers, a reinforcement made of PET and an intermediate layer intercalated between the inner layer and this reinforcement, it being pointed out that the intermediate and outer layers in contact with the PET are both specifically based on an ACM or an AEM that comprises carboxyl reactive sites and that is crosslinked with an amine. More specifically, the crosslinking system chosen for these two layers comprises a diamine as crosslinking agent and a guanidine coupled to a guanidine derivative chelated with a metal as crosslinking promoter, which prevents the known deterioration by aminolysis of PET in contact with ACM or AEM crosslinked with an amine.

A major drawback of the pipe presented in that document lies in the choice of this complex and expensive crosslinking system in relation with the ACM or AEM elastomer bearing sites that are necessarily carboxyls, and in the resulting relatively high manufacturing cost for the pipe.

SUMMARY OF THE INVENTION

One aim of the present invention is to propose a pipe usable for transporting air charged with oil in an air intake circuit for a motor vehicle engine, which overcomes these drawbacks, the pipe comprising at least one inner elastomer layer, one outer elastomer layer, one intermediate elastomer layer provided to facilitate the adhesion between the inner and outer layers, and one reinforcing structure situated radially between the intermediate and outer layers and comprising yarns based on an aliphatic polyester such as a PET, each of the intermediate and outer layers being formed from a composition specifically based on at least one ACM.

To this end, a pipe according to the invention is such that said composition is crosslinked with a system chosen from the group consisting of those based on at least one soap combined with sulfur, with a urea derivative and those based on a thiadiazole.

It will be noted that said composition of intermediate layer and outer layer may thus be free of AEM and also of any peroxide crosslinking system. Advantageously, this composition used for the intermediate and outer layers is free of crosslinking agent of amine or diamine type.

It will be noted that this pipe according to the invention thus makes it possible to avoid the problem of aminolysis of PET due to the use, on contact therewith, of an ACM crosslinked with a non-amino system that is compatible with PET, while at the same time having, surprisingly, satisfactory heat resistance at high internal and external temperatures and mechanical strength that is also satisfactory.

It will also be noted that this pipe of the invention, such as a hose for an air intake circuit at the outlet of a turbocompressor, can thus satisfactorily withstand average internal temperatures of about 180° C. and peak temperatures of 200° C. and average external temperatures of about 130° C. and peak temperatures of 150° C.

Also advantageously, said at least one copolymer of each of the intermediate and outer layers is an ACM which, for its crosslinking, incorporates halogenated, preferably chlorinated, reactive sites, and is free of any carboxyl reactive sites. Even more preferentially, the composition used for these intermediate and outer layers is crosslinked with a system based on soaps and sulfur.

It will be noted that these ACMs, which are preferentially of chlorinated grade and have the advantage of being relatively widespread, are crosslinkable using a system whose ingredients are widely available, which contributes toward not penalizing the overall manufacturing cost of the pipe.

According to one implementation example of the invention, these soaps comprise a mixture of sodium stearate, preferably in an amount of between 2 and 3 pce, and potassium stearate, preferably in an amount of between 0.2 and 0.4 pce (pce: parts by weight per one hundred parts of elastomer(s)).

It will also be noted that the use of this crosslinking system with soaps and sulfur gives the pipe according to the invention fatigue strength in compliance with constructors' requirements.

As crosslinking system based on a soap and a urea derivative that is usable in said composition of intermediate and outer layer, it is possible, for example, to use from 3 to 6 pce of sodium stearate as crosslinking agent and from 2 to 6 pce of "diuron" (e.g. 3-(3,4-dichlorophenyl)-1,1-dimethylurea)

as accelerator, supplemented with 0 to 1 pce of magnesium oxide as other accelerator and from 0 to 3 pce of stearic acid as retardant.

As thiadiazole-based crosslinking system that may be used in said composition of intermediate and outer layer, it is possible, for example, to use from 0.4 to 1 pce of thiadiazole of "Vanax 829" type as crosslinking agent, supplemented with 2 to 4 pce of tetrabenzylthiuram disulfide (TBzTD) as accelerator and from 0 to 3 pce of zinc stearate as retardant.

Preferably, said at least one copolymer of each intermediate and outer layer is a high-temperature-grade ACM (abbreviated as "ACM HT") optionally mixed with another ACM HT or with a fluorocarbon-based elastomer (FKM) with, in the latter case, the crosslinking system for the composition which also comprises a peroxide.

According to another characteristic of the invention, the inner layer may be based on at least one polar elastomer crosslinked with an amine or with a peroxide, which is chosen from the group formed by ACMs and AEMs (for example of Vamac® type), ethylene-vinyl acetate (EVA) copolymers, fluorosilicones and fluorocarbon-based elastomers (FKM), and mixtures thereof.

Preferably, the inner layer is based on at least one ACM crosslinked with an amine. It will be noted, surprisingly, that this inner layer makes it possible, in relation with intermediate and outer layers based on an ACM crosslinked with soaps and sulfur, to improve substantially the heat resistance of the pipe to high internal and external temperatures.

According to another characteristic of the invention, said reinforcing structure may comprise ribbed fabric or braid based on multifilament yarns made of one or more textile material(s), for example with different stiffnesses, at least one of which is a PET. In the present description, the term "yarn" denotes, in a known manner, both a spun yarn based on a multitude of small-diameter elementary filaments that are twisted together, and a twisted yarn obtained by twisting several spun yarns.

It will be noted that the inner, intermediate and outer elastomeric compositions, respectively, in accordance with the invention also comprise, besides said elastomer(s) and said crosslinking system, a reinforcing filler based on carbon black(s) and also all or part of the other ingredients or additives usually used in the elastomeric layers of pipes or hoses, such as, in a nonlimiting manner, processing agents and antioxidants.

An air intake circuit for a motor vehicle engine according to the invention, in particular for the intake of air leaving a turbocompressor, comprises at least one pipe as defined above, also provided with metal connectors that are mounted in contact with its inner layer and surface-coated with zinc and/or nickel.

Advantageously, the inner layer of the or of each pipe of the circuit is based on said at least one polar elastomer defined above that is crosslinked with an amine or a peroxide, i.e. with a sulfur-free system, which allows surface treatments of zinc/nickel type for connectors connected to this inner layer due to the compatibility of such a nonsulfur polar elastomer with the connectors thus treated.

BRIEF DESCRIPTION OF THE DRAWINGS

Other characteristics, advantages and details of the present invention will emerge on reading the following description of several implementation examples of the invention, which are given as nonlimiting illustrations, said description being given with reference to the attached drawing, in which:

FIG. 1 is a partial schematic view in perspective and with partial cutaways of a pipe according to the invention.

DETAILED DESCRIPTION

The pipe 1 illustrated in this FIGURE comprises, radially from the inside outward:

an elastomeric inner layer 10 that is leaktight and resistant to the corrosiveness of the transported fluid, i.e. especially designed to withstand the temperature of the air-oil mixture of an air intake circuit at the outlet of a turbocompressor and the corrosiveness of the oil contained in this mixture, the layer 10 possibly having a thickness of about 1.5 mm and being based, for example, on at least one ACM crosslinked with an amine, an elastomeric intermediate layer 12 provided to facilitate the adhesion between the layer 10 and an outer layer 16 of the pipe, the layer 12 possibly having a thickness of about 0.5 mm and being based, for example, on at least one ACM crosslinked with sulfur, a reinforcing structure 14, such as ribbed fabric whose yarns are made at least partly of PET (it being pointed out that this structure 14 may also incorporate yarns of different stiffness, for example made of polyamide, like the hybrid structure presented in document FR-B1-2 892 488 in the name of the Applicant), and the outer layer 16 made to withstand the external environment of the pipe in the region of the engine, the layer 16 possibly having a thickness of about 3 mm and being based, for example, on at least one ACM crosslinked with sulfur, just like the layer 12.

Layers 10, 12 and 16 may advantageously be obtained by coextrusion.

Table 1 below presents seven tests relating to various formulations A to G according to the invention for the intermediate layer 12 and outer layer 16 (of identical formulations) of pipes according to the invention, these tests having made it possible, respectively, to manufacture seven rectangular plates A to G, molded, press-vulcanized and fashioned in the form of specimens of H2 dumbbell type, the mechanical properties of which were measured in accordance with standard ISO 37 of 2005. The amounts used for these formulations of layers 12 and 16 are given in pce (parts by weight per one hundred parts of elastomer(s)).

TABLE 1

|  | Commercial name | A | B | C | D | E | F | G |
|---|---|---|---|---|---|---|---|---|
| ACM 1 | Noxtite PA 1402 | 75 | 75 | 100 | 75 |  |  | 80 |
| ACM 2 | Noxtite PA 402B | 25 | 25 |  | 25 | 100 |  |  |
| ACM 3 | Hytemp AR715 |  |  |  |  |  | 100 |  |
| ACM 4 | Hytemp AR72 HF |  |  |  |  |  |  |  |
| FKM | P757 |  |  |  |  |  |  | 20 |
| Carbon black | Spheron 1416 | 50 |  | 50 | 50 |  |  | 50 |
| Carbon black | Sterling SO N550 |  | 50 |  |  | 60 | 60 |  |
| White mineral oil (processing agent) | Marcol 82 | 2 | 2 | 2 | 2 | 2 | 2 | 2 |
| Antioxidant (diphenylamines) | Dusantox 86 | 2 | 2 | 2 | 2 | 2 | 2 | 2 |

TABLE 1-continued

| | Commercial name | A | B | C | D | E | F | G |
|---|---|---|---|---|---|---|---|---|
| Antioxidant (titanium oxide) | P25 | | | | | 2 | | |
| Stearic acid | — | 1 | 1 | 1 | 1 | 1 | 1 | 1 |
| Peroxide | DHBP | | | | | | | 0.15 |
| Crosslinking coagent | TAIC | | | | | | | 0.3 |
| Sodium stearate | — | 2 | 2 | 2 | 2 | 3 | 3 | 2 |
| Potassium stearate | — | 0.3 | 0.3 | 0.3 | 0.3 | 0.3 | 0.3 | 0.3 |
| Sulfur | — | 0.2 | 0.2 | 0.2 | 0.2 | 0.3 | 0.3 | 0.2 |
| MECHANICAL PROPERTIES | | | | | | | | |
| Shore A hardness | | 60 | 55 | 61 | 65 | 58 | 55 | 67 |
| Breaking strength (MPa) | Without aging | 12 | 11.7 | 13 | 11.6 | 9.9 | 10.4 | 12 |
| Elongation at break (%) | Without aging | 299 | 260 | 303 | 275 | 410 | 429 | 261 |
| Breaking strength (MPa) | Aging 72 h: air 200° C. | 7.5 | 8.4 | 8.4 | 8 | 4.8 | 4.57 | 8.7 |
| Elongation at break (%) | Aging 72 h: air 200° C. | 162 | 197 | 158 | 188 | 192 | 227 | 226 |

More specifically, the glass transition temperatures Tg and the Mooney viscosity ML(1+4) at 100° C. of the ACMs were as follows:
ACM 1: Tg=−28° C. and ML(1+4)=39
ACM 2: Tg=−31° C. and ML(1+4)=33
ACM 3: Tg=−17° C. and ML(1+4)=33
ACM 4: Tg=−28° C. and ML(1+4)=48.

As regards the FKM elastomer "P757", it had a temperature TR 10 of −15° C., a Mooney viscosity ML(1+10) at 121° C. of 44, and a fluorine content of 67%.

This table 1 shows that compositions A to G of the invention have satisfactory mechanical properties, when the elastomer matrix is formed from one or more ACMs crosslinked with a system including soaps and sulfur (in the case of pipes A to F) or when it predominantly comprises an ACM crosslinked with this system and an FKM crosslinked with peroxide (in the case of pipe G).

Pipes according to the invention were moreover manufactured, for which the intermediate layer 12 and outer layer 16 were each formed from said composition A, of which the inner layer 10 was based on an ACM crosslinked with an amine and whose reinforcing structure 14 was formed from ribbed fabric of PET multifilaments, and these pipes were subjected to decoupling endurance tests according to PSA standard B227110, the experimental conditions and results of which are given in Table 2 below.

TABLE 2

| | |
|---|---|
| Constant travel | ±30 mm |
| Pressure Pservice | 0 to 1.5 bar |
| Pressure Pmax. | 0 to 1.7 bar |
| Static pressure (decoupling for 46 hours) | 1 bar |
| Gas working temperature Tgw | 180° C. |
| Maximum gas temperature Tgmax. | 200° C. |
| Working external temperature Tew | 110° C. |
| Maximum external temperature Temax. | 130° C. |
| Minimum external temperature Temin. (decoupling for 46 hours) | −30° C. |
| Pulsed pressure | 60 000 cycles |
| Total travel (172 800 in phase 1 + 39 744 in decoupling) | 212 544 travels |
| Total time | 246 hours |

These endurance tests showed that the pipes according to the invention have satisfactory decoupling endurance, since they were judged as being compliant according to this PSA standard B227110.

The invention claimed is:

1. A pipe usable for transporting air charged with oil in an air intake circuit for a motor vehicle engine, the pipe comprising at least:
   one inner elastomer layer,
   one outer elastomer layer,
   one intermediate elastomer layer provided to facilitate the adhesion between the inner and outer layers, and
   one reinforcing structure which is situated radially between the intermediate and outer layers and which comprises yarns based on an aliphatic polyester, such as a polyethylene terephthalate (PET),
   each of the intermediate and outer layers being formed from a composition based on at least one acrylate copolymer (ACM),
   characterized in that the composition of the intermediate layer and of the outer layer is crosslinked by means of a crosslinking system selected from the group consisting of systems based on at least one soap combined with sulfur, systems based on at least one soap combined with a urea derivative, and systems based on a thiadiazole.

2. The pipe according to claim 1, wherein the composition of the intermediate layer and of the outer layer is free of crosslinking agent of amine or diamine type.

3. The pipe according to claim 1, wherein said at least one acrylate copolymer of each of the intermediate and outer layers is an ACM which, for its crosslinking, incorporates halogenated and chlorinated reactive sites and is free of any carboxyl reactive sites.

4. The pipe according to claim 1, wherein said composition is crosslinked by means of a system based on soaps and sulfur.

5. The pipe according to claim 4, wherein said soaps comprise a mixture of sodium stearate in an amount of between 2 and 3 pce, and of potassium stearate in an amount of between 0.2 and 0.4 pce (pce: parts by weight per one hundred parts of elastomer(s)).

6. The pipe according to claim 4, wherein said at least one copolymer of each of the intermediate and outer layers are a high-temperature-grade ACM (ACM HT), which is optionally mixed with another HT-grade ACM or with a fluorocarbon-based elastomer (FKM) with, in the latter case, the crosslinking system for said the composition of the intermediate layer and of the outer layer which also comprises a peroxide.

7. The pipe according to claim 1, wherein the inner layer is based on at least one polar elastomer crosslinked with an amine or with a peroxide, which is chosen from the group consisting of ACMs, AEMs, ethylene-vinyl acetate (EVA) copolymers, fluorosilicones and fluorocarbon-based elastomers (FKM), and mixtures thereof.

8. The pipe according to claim 1, wherein the composition of the intermediate layer and of the outer layer is crosslinked by means of a system based on soaps and sulfur, and wherein the inner layer is based on at least one ACM crosslinked with an amine.

9. The pipe according to claim 1, wherein said reinforcing structure comprises ribbed fabric or braid based on multifilament yarns made of one or more textile material(s), at least one of which is a PET.

10. An air intake circuit for a motor vehicle engine, in particular for the intake of air at the outlet of a turbocompressor, wherein the air intake circuit comprises at least one pipe according to claim 1, said pipe being provided with metal connectors that are mounted in contact with its inner layer and that are surface-coated with zinc and/or nickel.

11. The air intake circuit according to claim 10, characterized in that the inner layer of said at least one pipe is based on at least one polar elastomer crosslinked with an amine or with a peroxide, which is chosen from the group formed by ACMs, AEMs, ethylene-vinyl acetate (EVA) copolymers, fluorosilicones and fluorocarbon-based elastomers (FKM), and mixtures thereof.

\* \* \* \* \*